Feb. 22, 1966 A. J. CLARK 3,236,110

TUNING DEVICE

Filed May 29, 1963

INVENTOR.

Alfred J. Clark,

BY

Mueller & Aichele

Attys.

United States Patent Office 3,236,110
Patented Feb. 22, 1966

3,236,110
TUNING DEVICE

Alfred J. Clark, Palatine, Ill., assignor to Motorola, Inc., Franklin Park, Ill., a corporation of Illinois
Filed May 29, 1963, Ser. No. 284,147
4 Claims. (Cl. 74—10.27)

This invention relates to tuning devices for radio receivers or the like, and more particularly to tuning devices incorporating both pushbutton and manual knob tuning.

In general, tuning devices incorporating pushbutton and manual knob tuning involve the use of a treadle bar mechanism for controlling one or more tuning elements. Since the treadle bar mechanism must be capable of actuation by either the pushbutton mechanism or the manually operated knob, both actuating mechanisms are connected to one another through the treadle. This has caused certain difficulties since movement of the treadle by the pushbuttons necessarily serves to drive the gear train connected to the tuning knob. Because of the rather large gear ratio usually involved, a very substantial load must be overcome when the treadle is coupled to the tuning knob through the gear train and the treadle is moved by means of the pushbuttons. Thus, an inconveniently large force would be required to operate the pushbutton mechanism. In order to avoid this difficulty, it has been the practice to provide means for disengaging the gear train of the manual control knob from the treadle assembly when tuning by means of the pushbuttons. This has involved the incorporation of clutch disks, declutch bars, springs, and other parts, into the tuning mechanism, and adds to the cost and difficulty of its assembly.

It has been proposed to eliminate the incorporation of such extra parts by utilizing a slip clutch which maintains a frictional force coupling the gear train of the manual control knob to the treadle assembly. This frictional force is greater than that required to actuate the treadle bar mechanism by turning the manual knob, but is less than that required to direct the gear train connected to the tuning knob from the treadle mechanism. Accordingly, when the treadle mechanism is actuated by a pushbutton, the clutch will slip and prevent driving of the gear train connected to the tuning knob. Such an arrangement is disclosed in Patent No. 2,967,431, issued January 10, 1961, to Louis A. Bevacque and assigned to the assignee of the present invention.

It is an object of the present invention to provide an improved slip clutch mechanism for a tuning device incorporating pushbutton and manual knob tuning.

It is another object of the invention to provide a tuning mechanism in which pushbutton controls can be operated easily by application of a relatively small pressure.

Yet another object of the present invention is to provide a simple tuning device which is relatively inexpensive and easy to assemble, while permitting easy operation of the pushbutton tuning means.

A feature of the invention is the provision of a torque transfer arrangement between the manual drive mechanism and the pushbutton drive mechanism for a tuner, which incorporates mutually engaged pinch washers and disks, with the pinch washers exerting frictional engagement with the disk of a degree which permits slippage when the pushbuttons are actuated, but which transmits the motion when the manual tuning knob is actuated.

Still another feature of the invention is the provision of a planet and sun torque transfer arrangement wherein pinch washer disk transmission is used, and wherein the pinch washers exert a frictional force on the disk of a value permitting slippage when torque is initiated from one end of the transmission system, but which is sufficient to transfer torque initiated from the opposite end of the system.

Yet another feature of the invention is the provision of a freely rotatable disk carrying a plurality of smaller disks having fixed axes about the freely rotatable disk and displaced from the axis thereof, which plurality of disks are engaged by pinch washers exerting a predetermined amount of frictional force thereon.

Figures 1, 2, 3, 4:
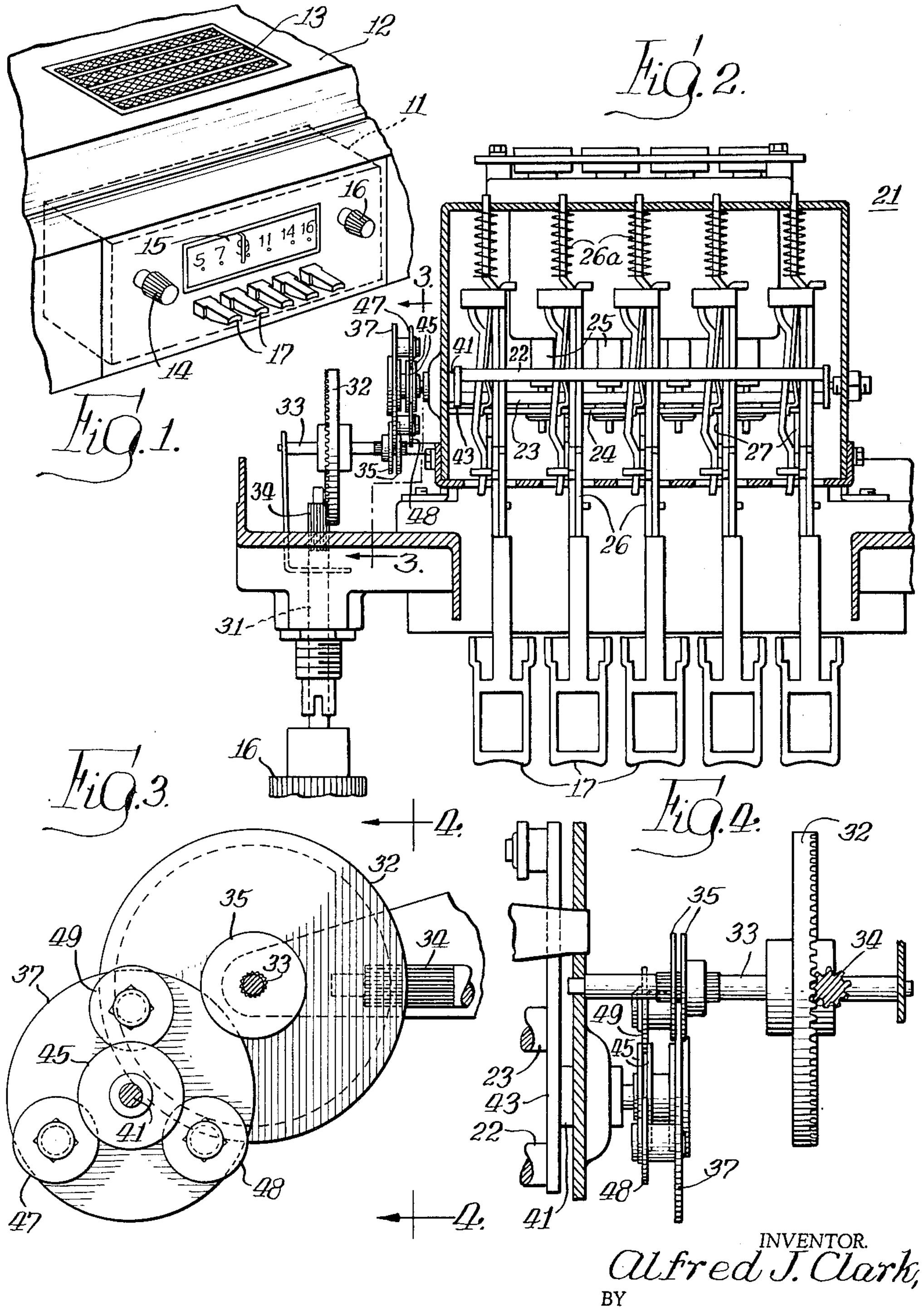
FIG. 1 is a perspective view of a type of radio receiver in which a tuner mechanism of the invention may be incorporated.
FIG. 2 is a bottom view, partially in section, of a tuner mechanism constructed in accordance with the invention.
FIG. 3 is a sectional view taken along the line 3—3 of FIG. 2.
FIG. 4 is a sectional view taken along the line 4—4 of FIG. 3.

The present invention includes a tuning device useful in connection with a radio receiver or the like having two independently operable tuning means for actuating a tuning element such as a coil. An independently rotatable disk is driven through a torque transmitting train from a manual tuning knob. This disk incorporates three smaller disks mounted thereon with their axes of rotation displaced from the axis of rotation of the larger disk. The smaller disks are engaged by a pinch washer which is drivably connected to a treadle bar mechanism directly operable by the pushbutton slides of the tuner. The frictional resistance provided by the gripping effect of the pinch washers on the small disks is sufficient to prevent the small disks from turning when the larger disk is driven through the torque transmitting train. Accordingly, the treadle bar mechanism may be driven from the manual tuning knob. When the treadle bar mechanism is driven directly from the pushbutton slides, however, the frictional resistance to the turning of the small disks is insufficient to overcome the force required to drive the larger disk, and hence the torque transmitting train to the manual tuning knob. As a result, the pinch washer slips on the smaller disks, causing them to rotate while the larger disk remains stationary. As an alternative, the disks and pinch washers can be reversed in the structure.

Referring now more particularly to FIG. 1, and automobile radio receiver 11 is shown mounted in the dashboard 12 of an automobile. A speaker opening 13 is provided in the top of dashboard 12, and the radio incorporates a volume control 14, an indicator dial 15, a tuning knob 16, and a plurality of tuning pushbuttons 17. Radio receiver 11 may be tuned by means of either knob 16, which provides continuous rotary tuning, or by depression of one of pushbuttons 17, each of which may be preset for a given tuner position.

Referring now to FIGS. 2 through 4, the general construction of the drive mechanism of the tuner 21 may be seen. The tuner 21 incorporates a treadle assembly consisting of cross-bars 22 and 23 with a core carriage 24 carried thereon. Rotation of the treadle assembly causes movement of the core carriage 24 which is operatively connected to the tuning elements such as the tuning coils indicated generally at 25.

Pushbutton arms 26, which are shown as being the push-to-lock type, carry adjustable cams 27 for contacting the cross-bars 22 and 23 when pushbutton arms 26 are moved toward the treadle assembly by actuation of the pushbutton 17. Each pushbutton arm 26 works against a corresponding return spring 26a which causes it to return to its original position after actuating the treadle assembly.

The treadle assembly may also be positioned by means of manual control knob 16. Control knob 16 is fixed on a control shaft 31 for driving the same. Control shaft 31 has a driving pinion 34 thereon which engages a crown gear 32 fixed on a transmitting shaft 33. Also drivingly fixed to shaft 33 are pinch washers 35 which rotate with crown gear 32 when crown gear 32 is driven by pinion 34 on control shaft 31.

Pinch washers 35 drive a large disk 37 which is independently rotatable from the treadle mechanism. The treadle mechanism may be rotated by a short drive shaft 41 which is fixed to one of the connecting arms 43 of cross-bars 22 and 23. Pinch washers 45 are drivingly fixed on shaft 41 and when pinch washers 45 are turned, shaft 41 is turned to position the treadle mechanism and hence tuning carriage 24 for tuning the receiver.

Connection is made between large disk 37 and pinch washers 45 by three smaller disks 47, 48 and 49, which are fixed to large disk 37 and have their respective axes of rotation displaced from the axis of rotation of large disk 37 which is co-axial with drive shaft 41. The arrangement is effectively that of sun and planet gears, however, slippage is provided, as will be explained, which is not attainable but using gears.

The tuner may be manually operated in a continuous manner by turning control knob 16. This in turn causes gear 34 on control shaft 31 to turn crown gear 32 and shaft 33. Shaft 33 turns pinch washers 35 which drive large disk 37. Accordingly, the axes of rotation of disks 47, 48 and 49 rotate about the axis of rotation of large disk 37. The pinch washers 45 are constructed to exert a frictional force against the surfaces of disks 47, 48 and 49 of a predetermined amount. This amount is selected such that when large disk 37 is driven due to the turning of control knob 16, disks 47, 48 and 49 will not rotate about their respective axes, but will move about the axis of rotation of disk 37. This causes pinch washers 45 to rotate, and hence, drive drive shaft 41 which in turn operates the treadle assembly. Since the treadle assembly may be constructed to be easily moved, such as by ball bearing mounting, the frictional force required to prevent disks 47, 48 and 49 from rotating may be kept minimum.

When the treadle bars are desired to be positioned by depression of one of pushbuttons 17, the mechanism is constructed such that very little force is presented to the depression of pushbutton 17, and so that knob 16 will not be rotated. This occurs due to the fact that a great deal more force is required to drive the torque transfer train from disk 37 to knob 16 than is required to turn the treadle mechanism. Accordingly, where before the frictional force exerted on disks 47, 48 and 49 by pinch washers 45 was sufficient to prevent rotation of disks 47, 48 and 49 when the treadle mechanism was driven by knob 16, the resistance to rotation of disk 37 presented by the torque transfer train overcomes this frictional force when the treadle bar assembly is rotated by depression of one of pushbuttons 17. Accordingly, as pinch washers 45 rotate with drive shaft 41, disks 47, 48 and 49 will rotate about their respective axes, and large disk 37 will remain stationary. Thus in this latter instance, slippage between pinch washers 45 and disks 47, 48 and 49 acts as a clutch to decouple tuning knob 16 and its associated torque transfer train from the treadle assembly.

If more force is desired to be presented to pushbuttons 17, disks 47, 48 and 49 may be replaced by pinch washers, and pinch washers 45 may be replaced by a disk. Such reversal of parts is believed to be well within the scope of the invention.

It may therefore be seen that the invention provides an improved and efficient dual control tuning mechanism in which either control means may be operated independently of the other. More particularly it involves pushbutton tuning means which means may be operated in a device having knob control means without the necessity of supplying an elaborate declutching mechanism for effecting disengagement between the pushbutton and the knob controls when the pushbutton controls are operated. Furthermore, the necessity for a separate clutch is eliminated since the system contains an inherent declutching function.

I claim:

1. A manual drive system for positioning an object incorporating a treadle mechanism for controlling the position of the object and a plurality of pushbutton operable slides individually engageable with the treadle mechanism for positioning the same, said system including in combination, a manually accessible control knob, a rotatable member, means transferring torque between said control knob and said rotatable member, first rotatable torque transmitting means coaxial with said rotatable member and drivingly connected to the treadle mechanism for positioning the same, second rotatable torque transmitting means mounted on said rotatable member and having an axis of rotation offset from the axis of rotation of said rotatable member, said first and second torque transmitting means comprising mutually engaged pinch washers and a disk, with said pinch washers exerting a predetermined frictional force on said disk, such predetermined frictional force being less than the frictional force which must be developed to turn said rotatable member by movement of the treadle mechanism so that said second torque transmitting means rotates about its axis in response to actuation of the pushbuttons and said rotatable member remains stationary, said predetermined frictional force being greater than the frictional force which must be developed to cause movement of the treadle mechanism by the control knob so that said second rotatable torque transmitting means moves about the axis of said rotatable member without rotating about its own axis, in response to operation of said control knob.

2. A manual drive system for a wave signal tuner incorporating a treadle mechanism for controlling the tuner and a plurality of pushbutton operable slides individually engageable with the treadle mechanism for positioning the same, said system including in combination, a manually accessible control knob, a rotatable member, means transferring torque between said control knob and said rotatable member, first rotatable torque transmitting means coaxial with said rotatable member and drivingly connected to the treadle mechanism for positioning the same, second rotatable torque transmitting means mounted on said rotatable member and having an axis of rotation off-set from the axis of rotation of said rotatable member, said first and second torque transmitting means comprising mutually engaged pinch washers and a disk, with said pinch washers exerting a predetermined frictional force on said disk, such predetermined frictional force being less than the frictional force which must be developed to turn said rotatable member by movement of the treadle mechanism so that said second torque transmitting means rotates about its axis in response to actuation of the pushbuttons, said predetermined force being greater than the frictional force which must be developed to cause movement of the treadle mechanism by the control knob so that said second torque transmitting means is prevented from rotating about its own axis in response to operation of said control knob, said pushbutton operable slides causing movement of said treadle mechanism by applying thereto a force sufficient to overcome said predetermined force applied to said second torque transmitting means so that said second torque transmitting means rotates with respect to said rotatable member and said rotatable member remains stationary, with said first and second torque transmitting means cooperating to transmit torque to actuate the treadle mechanism when said control knob is actuated.

3. A wave signal tuner mechanism including in combination, a treadle mechanism for controlling the tuner, a plurality of pushbutton operable slides individually engageable with the treadle mechanism for positioning the same, a manually accessible control knob, a first rotatable disk, means transferring torque between said control knob and said rotatable disk, a pair of pinch washers coaxial with said rotatable disk and drivingly connected to the treadle mechanism for positioning the same, a second rotatable disk mounted on said first rotatable disk and having an axis of rotation off-set from the axis of rotation of said first rotatable disk, said second rotatable disk being engaged by said pinch washers with said pinch washers exerting a predetermined frictional force on the surface of said second rotatable disk, such predetermined frictional force being less than the frictional force which must be developed to turn said first rotatable disk by movement of the treadle mechanism so that said second rotatable disk rotates about its axis in response to actuation of said pushbutton operable slides and said first rotatable disk remains stationary, said predetermined force being greater than the frictional force which must be developed to cause movement of said treadle mechanism by the control knob so that said second rotatable disk moves about the axis of said first rotatable disk as said latter disk is rotated without said second disk rotating about its own axis, in response to operation of said control knob.

4. A wave signal tuner having provision for inherent declutching action, including in combination, a treadle mechanism for controlling the tuner, a plurality of pushbutton operable slides individually engageable with the treadle mechanism for positioning the same, a manually accessible control knob, a first rotatable disk, means transferring torque between said control knob and said first rotatable disk, a pair of pinch washers coaxial with said first rotatable disk and drivingly connected to the treadle mechanism for positioning the same, three rotatable disks substantially smaller than said first rotatable disk mounted on said first rotatable disk, each of said smaller rotatable disks having an axis of rotation offset from the axis of rotation of said first rotatable disk, said pinch washers engaging said three smaller rotatable disks and exerting a predetermined frictional force thereon, such predetermined frictional force being less than the frictional force which must be developed to turn said first rotatable disk by movement of the treadle mechanism so that said smaller rotatable disks rotate about their respective axes in response to actuation of said pushbuttons, said predetermined force being greater than the frictional force which must be developed to cause movement of said treadle mechanism by the control knob so that said smaller rotatable disks move about the axis of said first rotatable disk without rotating about their own respective axes in response to operation of said control knob, said pushbutton operable slides causing movement of said treadle mechanism by applying thereto a force sufficient to overcome said predetermined frictional force applied to said smaller rotatable disks by said pinch washers so that said smaller rotatable disks rotate with respect to said first rotatable disk and said first rotatable disk remains stationary, with said pinch washers and said smaller rotatable disks cooperating to transmit torque to actuate said treadle mechanism when said control knob is actuated.

No references cited.

MILTON KAUFMAN, *Primary Examiner.*